(No Model.)

R. M. HUNTER.
ELECTRIC RAILWAY.

No. 445,952. Patented Feb. 3, 1891.

Attest
A. J. Dunn
J. T. Yerkes

Inventor

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 445,952, dated February 3, 1891.

Original application filed September 23, 1886, Serial No. 214,309. Divided and this application filed September 4, 1890. Serial No. 363,898. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists of certain improvements, which are fully set forth in the following specification and shown in the accompanying drawings, which form a part thereof.

This application (Case 166) is a division of my application, Serial No. 214,309, dated September 23, 1886.

My invention comprehends a system of electrical distribution as applied to electric railways, in which there are employed extensive line-conductors, presenting objectionable resistances, possibility of leakages, &c. In electric railways where there are a large number of cars in circuit the resistance of the line-conductors becomes an item of importance and presents serious obstacles to the proper distribution of the current with the employment of small line-conductors. To overcome this difficulty I connect the generator or generators of electricity with different parts of the same circuit by suitable feeding-wires. By this means I may be enabled to locate a central station at a convenient place and supply current by such feed-wires to different distant parts of the same line-conductor, and thus overcome the detrimental effect due to connecting the generator or generators at one place only on the line.

I do not confine myself to any system or arrangement of circuits, as they may be greatly modified without departing from my invention.

Figure 1:
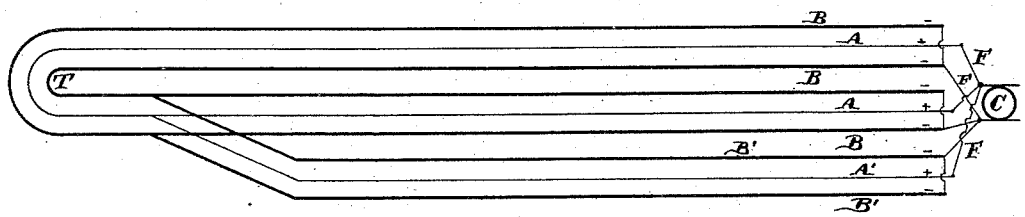
Figure 6:
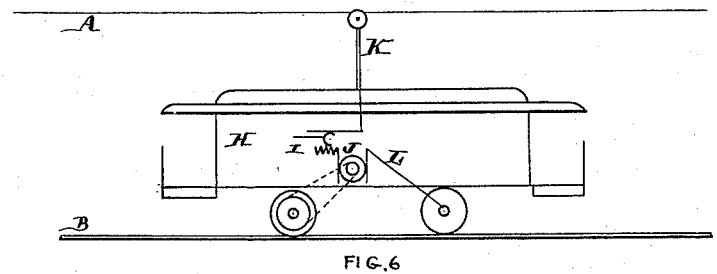
Figure 7:
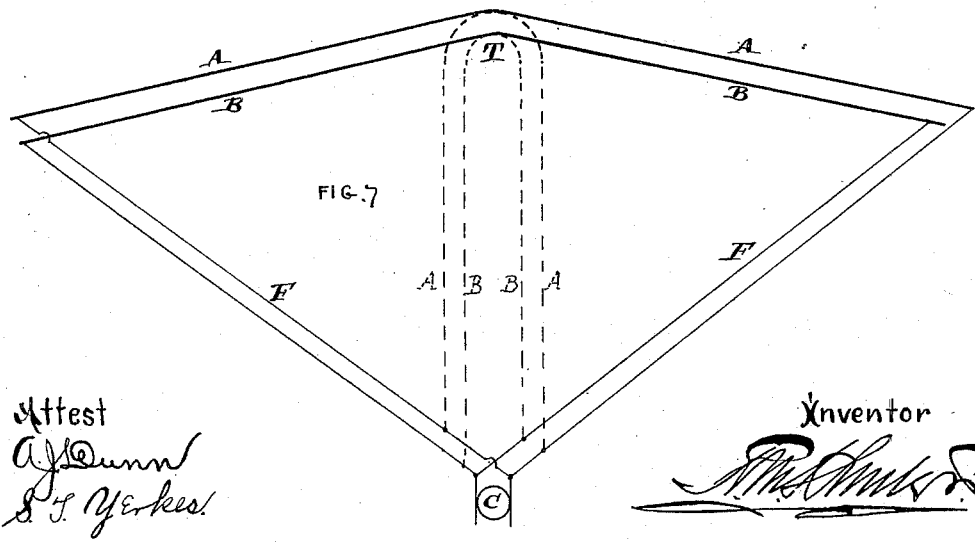

In the drawings, Figure 1 is a plan view of a system of railway-circuits in which we have the two conductors of two tracks looped at one end and the conductor of a third track connected to one of the other tracks by a switch-connection, and in which all of the tracks are supplied from the same source of power by suitable feeding or supply wires. Figs. 2, 3, 4, and 5 are cross-sections of various forms of electric railways, showing different arrangements of the conductors which may be used. Fig. 6 is an elevation of an electrically-propelled car adapted for use on the said railway; and Fig. 7 is a diagram illustrating a modification of the looped circuit shown in Fig. 1, wherein the conductors of the two tracks are spread apart at one end.

A and B are the two lines of working-conductors and may include or not, as desired, the rails.

Figures 2, 3, 4, 5:
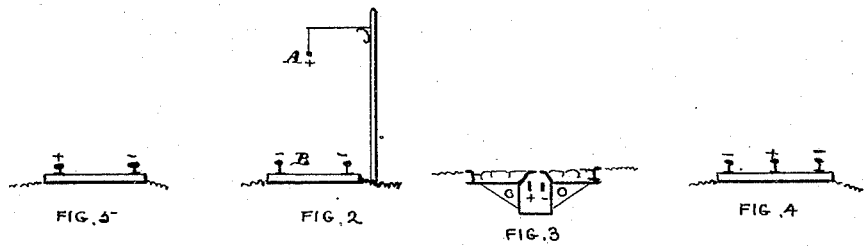

In Fig. 2 we have the rails as the return-conductors and the positive or out going conductor suspended above the railway.

In Fig. 3 we have both conductors in a slotted conduit. It is evident that in this case one of the conductors might be the rails or conduit, if so desired.

In Fig. 4 we have a third rail or surface outgoing conductor as a positive conductor and the traffic rails as the return.

In Fig. 5 we have each of the rails acting as a conductor of different polarity.

In Fig. 1 the heavy lines B and B' represent rails, and the light intermediate lines A and A' represent the line or suspended conductors extending along the railway for supplying positive current.

In Fig. 1 we have a looped railway formed of the conductors A B, combined with a branch track having conductors A' B', and with one generator C, connected by feeding-conductors F with the terminals of the railway-conductors. The positive pole of the generator is coupled with all of the positive terminals of the railway-conductors by separate feeding-conductors F, and likewise the negative pole of the generator is coupled with the negative terminals of the railway-conductors by similar feeding-conductors F. We have here feeding-conductors leading from a source of electric supply and connecting with the line-conductor at different places widely separate, electrically considered. The two upper railway-tracks are looped, as at T, and all of the conductors of similar polarity may be coupled in parallel, so that the current-potential in the various lines equalizes itself during the working of the railway.

In this application I have shown in Fig. 1 two sets of heavy lines B B, to correspond to the rails, and one set of light lines A, to correspond to the positive conductor, to illustrate the construction such as is clearly indicated in Figs. 2 and 26 in my application of which this is a division. The figure of my original application, which corresponds to Fig. 1 of this application, is Fig. 13, which is designed to show the connection between the generator and positive and negative conductors of a railway which may be specifically constructed, as indicated in Figs. 2 and 26 of that application, wherein a suspended conductor is employed to supply positive current. In the construction shown in Fig. 26 of my original application the rails are the negative conductors and the suspended conductor is the positive conductor. Fig. 1 of this application therefore indicates the circuits of Fig. 13 of the original application applied to the construction of railway indicated in Fig. 26 of said application.

In the modification diagram shown in Fig. 7 I have illustrated the looped railway of Fig. 1 in dotted lines, and have spread the adjacent terminals apart, as indicated in solid lines, stretching out the feeding-conductors F. The only difference between these two diagrams, Figs. 1 and 7, so far as the conductors A B F and generator C are concerned, is that the railway-track is made more straight and the feeding-conductors increased in length. This particular Fig. 7 is designed only as an illustrative drawing to indicate the scope of the invention set out in Fig. 1 in the parts contained by the letters A, B, T, F, and C, and said Fig. 7, while applied to the construction shown in Fig. 13 of the original application, is not specifically shown in said original application.

In Fig. 6 is shown an electric car H, having an electric motor J to propel it. K is an upwardly-extending current-collecting device, making an under running contact with the suspended conductor A for collecting current therefrom and supplying it to the motor-circuit L on the car, the current being regulated by a resistance changer or regulator I. Any form of collector may be used to suit either of the systems shown in Figs. 2, 3, 4, and 5.

When a large number of cars are on circuit, the operation of the resistance-changer I on the various cars constantly varies the current flowing through the motors, and this varies the demand for current. When large numbers of cars congregate at one portion of the railway, it takes considerable current, and if it were not for the feeding-conductors connecting with distant parts of the conductors, electrically considered, such congregation of cars might find too little current to be properly operative. There are a variety of contingencies which must be met in practical operation of an electric railway employing line-conductors, and those specified in this application are among some of the important ones.

I do not confine myself to any particular arrangement of the railway-circuits, as they might be modified in various ways without departing from the principles of my invention.

Having now described my invention, what I claim as new, and desire to secure by Letters Patent, is—

1. In an electric railway, the combination of a line-conductor extending along the railway, electrically-propelled cars moving on said railway and receiving current from the conductor, an electric generator for supplying current to said line-conductor, and two or more feeding-conductors connecting one pole of the generator with different distant parts of the line-conductor.

2. In an electric railway in which the rails and earth form a return-circuit, the combination of the rails and a suspended line-conductor with electrically-propelled cars running upon said railway and making a traveling connection with the rails and having an upwardly-extending current-collecting device making a traveling connection with the line-conductor, a generator of electricity, and two or more feeding-conductors leading from the generator to distant portions of the line-conductor.

3. In an electric railway in which the rails and earth form a return-circuit, the combination of the rails and a suspended line-conductor with electrically-propelled cars running upon said railway and making a traveling connection with the rails and provided with an upwardly-extending collector making connection with the line-conductor, a generator of electricity, two or more feeding-conductors leading from the generator to distant portions of the line-conductor, and an electrical connection between the generator and one place along the rails.

4. The combination of a line-conductor extending along a railway, a series of independently electrically-propelled vehicles receiving current therefrom, current-controlling devices on said vehicles to vary the current received from the line-conductor, a generator of electricity, and separate feeding-conductors extending from the generator and connecting with distant portions of the line-conductors.

In testimony of which invention I have hereunto set my hand.

R. M. HUNTER.

Witnesses:
 ERNEST HOWARD HUNTER,
 A. J. DUNN.